United States Patent
Taylor et al.

(10) Patent No.: US 12,471,942 B2
(45) Date of Patent: Nov. 18, 2025

(54) TOOL ADAPTED TO CONNECT TUBING OF AN IMPLANTABLE PENILE PROSTHESIS

(71) Applicant: Coloplast A/S, Humlebaek (DK)

(72) Inventors: Jeffrey Brian Taylor, Forest Lake, MN (US); Wei Zhang, Eden Prairie, MN (US); Samuel M. Shreve, Minneapolis, MN (US); John Clegg, Minneapolis, MN (US)

(73) Assignee: Coloplast A/S, Humlebaek (DK)

( * ) Notice: Subject to any disclaimer, the term of this patent is extended or adjusted under 35 U.S.C. 154(b) by 1022 days.

(21) Appl. No.: 17/539,226

(22) Filed: Dec. 1, 2021

(65) Prior Publication Data

US 2022/0168006 A1 Jun. 2, 2022

Related U.S. Application Data

(60) Provisional application No. 63/243,748, filed on Sep. 14, 2021, provisional application No. 63/150,593, (Continued)

(51) Int. Cl.
*A61B 17/30* (2006.01)
*A61F 2/26* (2006.01)
*A61B 17/00* (2006.01)

(52) U.S. Cl.
CPC ............... *A61B 17/30* (2013.01); *A61F 2/26* (2013.01); *A61B 2017/0042* (2013.01); *A61B 2017/00858* (2013.01)

(58) Field of Classification Search
CPC ... A61B 17/0483; A61B 17/282; A61B 17/28; A61B 17/29; A61B 17/30; A61F 2/26
See application file for complete search history.

(56) References Cited

U.S. PATENT DOCUMENTS 717,526 A 1/1903 Barney
2,641,148 A 6/1953 Arthur
(Continued)

FOREIGN PATENT DOCUMENTS

DE 3834296 A1 12/1989
DE 9307957 U1 9/1993
(Continued)

OTHER PUBLICATIONS

Maexxna 24pcs Wire Clamps ⅜ Inch, Stainless Steel 304 Cable Clamps Rubber Cushion , Pipe Clamp for wiring, lines, hoses and cables, Maexxna, Amazon, [Post date: Dec. 24, 2020], [Site seen May 19, 2022] Seen at URL: https://www.amazon.com/ Maexxna-Clamps-Stainless-Rubber-Cushion/dp/B08R8RL2NR/ref=sr _1_35 (Year: 2020).
(Continued)

*Primary Examiner* — Carrie R Dorna
(74) *Attorney, Agent, or Firm* — Coloplast Corp., Coloplast A/S; Nick Baumann

(57) ABSTRACT

A tool is provided in a kit of parts for an implantable penile prosthesis that includes a first tubing section and a first connector that is attachable to a second tubing section and a second connector. The tool has a vertex end and an open end, a first arm extending from the vertex end to a first distal end, and a second arm extending from the vertex end to a second distal end. The first distal end is spaced apart from the second distal end to define the open end of the tool.

10 Claims, 13 Drawing Sheets

Related U.S. Application Data filed on Feb. 18, 2021, provisional application No. 63/120,288, filed on Dec. 2, 2020.

(56) References Cited

U.S. PATENT DOCUMENTS

| | | | |
|---|---|---|---|
| 2,665,692 A * | 1/1954 | L Esperance | A61B 17/04 294/99.2 |
| 2,920,514 A | 1/1960 | McKeehan et al. | |
| D192,333 S | 3/1962 | Buechler et al. | |
| 3,172,319 A | 3/1965 | Stanfield | |
| 3,845,538 A | 11/1974 | Demler, Sr. | |
| 3,952,619 A | 4/1976 | Cook | |
| D241,708 S | 10/1976 | Frederiksson | |
| 4,257,135 A | 3/1981 | Moebius | |
| 4,322,123 A | 3/1982 | Newell | |
| 4,571,808 A | 2/1986 | King | |
| 4,632,435 A * | 12/1986 | Polyak | B25B 7/02 285/179 |
| 4,757,588 A | 7/1988 | Churchich | |
| 4,769,891 A | 9/1988 | Corral | |
| D299,168 S | 12/1988 | Bergstrom et al. | |
| D329,374 S | 9/1992 | Kaga | |
| 6,174,321 B1 * | 1/2001 | Webb | A61B 17/30 606/205 |
| D443,201 S | 6/2001 | Bendick | |
| 6,530,099 B1 | 3/2003 | Iwinski | |
| D484,400 S | 12/2003 | Blake et al. | |
| 6,796,586 B2 | 9/2004 | Werth | |
| D572,552 S | 7/2008 | Feliciano | |
| D623,508 S | 9/2010 | Reichle et al. | |
| D670,396 S | 11/2012 | Doogan | |
| 8,418,372 B1 | 4/2013 | Risley, Sr. et al. | |
| 8,458,877 B1 | 6/2013 | Falconette | |
| D719,662 S | 12/2014 | Pope | |
| 8,939,889 B1 | 1/2015 | Chechik | |
| D753,989 S | 4/2016 | Jakobsen | |
| D757,278 S | 5/2016 | Haines et al. | |
| 9,333,079 B2 | 5/2016 | Daniel | |
| D763,066 S | 8/2016 | Sugimoto | |
| D767,761 S | 9/2016 | Babb et al. | |
| 9,451,982 B1 | 9/2016 | Taylor | |
| 9,561,584 B2 | 2/2017 | Peirce | |
| D841,804 S | 2/2019 | Sommer et al. | |
| D879,007 S | 3/2020 | Dimovski | |
| 10,617,439 B2 | 4/2020 | Deodhar et al. | |
| D889,952 S | 7/2020 | Maurer | |
| D890,603 S | 7/2020 | Maurer | |
| D899,913 S | 10/2020 | Feldman et al. | |
| D907,204 S | 1/2021 | Pilletere et al. | |
| D938,814 S | 12/2021 | Wickham et al. | |
| 11,247,260 B1 * | 2/2022 | Othman | B25B 27/10 |
| D947,374 S | 3/2022 | Lindsay | |
| D965,142 S | 9/2022 | Clegg et al. | |
| 2003/0006610 A1 | 1/2003 | Werth | |
| 2006/0042062 A1 | 3/2006 | Tally | |
| 2006/0225894 A1 | 10/2006 | Roll et al. | |
| 2006/0288552 A1 | 12/2006 | Roll et al. | |
| 2008/0314205 A1 | 12/2008 | Feliciano | |
| 2010/0088869 A1 | 4/2010 | Webb et al. | |
| 2013/0093184 A1 * | 4/2013 | Peirce | F16L 13/146 29/237 |
| 2013/0167343 A1 | 7/2013 | Goulet et al. | |
| 2018/0214271 A1 * | 8/2018 | Poucher | A61F 2/26 |
| 2019/0336745 A1 | 11/2019 | Mujwid et al. | |
| 2021/0177447 A1 | 6/2021 | Morey et al. | |

FOREIGN PATENT DOCUMENTS

| | | |
|---|---|---|
| DE | 9311131 U1 | 11/1993 |
| DE | 10141077 A1 | 3/2003 |
| EP | 0737832 A1 | 10/1996 |
| GB | 305859 A | 2/1929 |
| GB | 703853 A | 2/1954 |
| GB | 1428583 A | 3/1976 |
| GB | 6195187 | 3/2022 |
| JP | D1667943 | 9/2020 |
| KR | 20200108961 A | 9/2020 |

OTHER PUBLICATIONS

Steel clip Mfr. Model #CC289-01, Kraft Tool, Grainger, [Post date unknown], [Site seen May 19, 2022], Seen at URL: https://www.grainger.com/product/KRAFT-TOOL-Clip-Steel-38LY49 (Year: 2022).

* cited by examiner

TOOL ADAPTED TO CONNECT TUBING OF AN IMPLANTABLE PENILE PROSTHESIS

SUMMARY

Implantable penile prostheses have proven to be an effective solution to erectile dysfunction. One form of a penile prosthesis includes a pump to move liquid from a reservoir into inflatable cylinders that are implanted in the penis. The reservoir and the pump are connected by tubing, and each individual patient is fitted for a specific length of custom-sized tubing, for example by cutting the tubing to a desired length. A connector is placed between the pump tubing and the reservoir tubing. The prosthesis often includes a hydrophilic coating that aids in implantation, both in making the implant slippery and in absorbing antibiotic solutions selected by the surgeon to aid in post-surgical healing. However, the hydrophilic coating (in addition to the blood and irrigation liquids) can make the related tubing and the connector slippery and difficult to handle. The surgeon will typically try to manually push the sliding sleeves of the connector together to connect the reservoir and the pump tubing, which is difficult with gloved hands, particularly when the connector sleeves and tubing become slippery.

A tool is described that allows the surgeon to engage the connector sleeves and push the connector sleeves over their respective connector cages to secure a connector assembly between two separated sections of the tubing. The tool is preferably sterile and disposable and is usefully provided in a separate kit of parts or kitted with an implantable prosthesis to allow the implantation to be more efficient.

Aspects of the embodiments described in this patent application provide a tool provided in a kit of parts for an implantable penile prosthesis that includes a first tubing section that is attachable to a second tubing section by a connector assembly. The tool allows convenient connection of the tubing sections by pinching the otherwise slippery connector sleeves together.

The tool comprises:
  a vertex end and an open end;
  a first arm extending from the vertex end to a first distal end, and a second arm extending from the vertex end to a second distal end, where the first distal end is spaced apart from the second distal end to define the open end of the tool;
  a first touch pad is connected to the first arm, where the first touch pad has a first width that is wider than a width of the first arm; and
  a second touch pad is connected to the second arm, where the second touch pad has a second width that is wider than a width of the second arm;
  wherein the first arm comprises:
    a first recess opening formed between an exterior surface of the first arm and an interior surface of the first arm,
    a first collar integrated with the exterior surface of the first arm, where the first collar forms an open diameter that is less than a diameter of the first recess opening, and
    a first slot formed in the first distal end through a portion of the first collar and in communication with the first recess opening;
  wherein the second arm comprises:
    a second recess opening formed between an exterior surface of the second arm and an interior surface of the second arm,
    a second collar integrated with the exterior surface of the second arm, where the second collar forms an open diameter that is less than a diameter of the second recess opening, and
    a second slot formed in the second distal end through a portion of the second collar and in communication with the second recess opening;
  wherein the first slot formed in the first distal end is sized to receive the first tubing section and the second slot formed in the second distal end is sized to receive the second tubing section;
  wherein the first collar of the first arm is adapted to capture a first sleeve of the connector assembly in the first recess opening, and the second collar of the second arm is adapted to capture a second sleeve of the connector assembly in the second recess opening.

In one embodiment, the vertex comprises a flexible hinge that allows for elastic recovery of the arms to their initial open position. The flexible hinge may acceptably be formed by a semi-circular-shaped vertex instead of a vertex formed by an acute angle, or by a living hinge.

In one embodiment, the vertex forms an acute angle measured between the interior surface of the first arm and the interior surface of the second arm which provides a compact tool that is easy to mold or manufacture.

In other embodiments, the vertex includes a circular portion that allows greater force to be applied by the arms to the connector sleeves.

In one embodiment, the first touch pad comprises a non-circular outside diameter of an ellipse that allows the surgeon to identify the gripping area by touch or feel.

In one embodiment, the first touch pad comprises a textured exterior surface to provide a high friction low slip surface area.

In one embodiment, the first touch pad projects a distance above the exterior surface of the first arm to provide a more robust engagement surface for the fingers of the surgeon.

In one embodiment, the interior surface of the first arm is planar.

In one embodiment, the interior surface of the first arm is not planar and the tool further includes a first spline, where the first spline has a first end beginning where the vertex ends at the first arm, with the first spline extending over the first arm and the first touch pad and terminating at a second end at the first collar.

DETAILED DESCRIPTION

Figure 1:
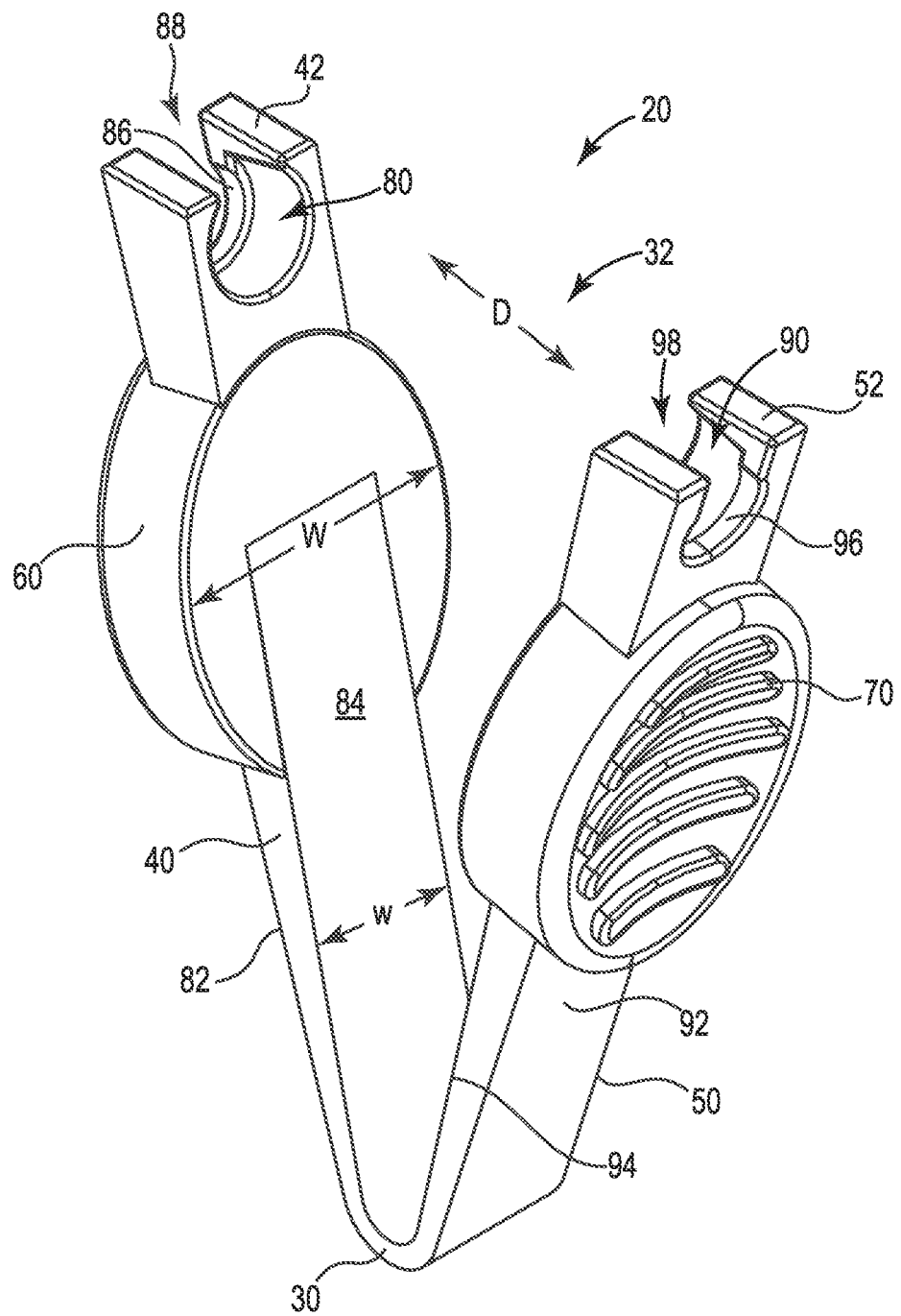
FIG. 1 is an isometric view of one embodiment of a tool.

In the following detailed description, reference is made to the accompanying drawings. The drawings form a part of this specification and illustrate exemplary embodiments for practicing the invention. Directional terminology, such as "top," "bottom," "front," "back," "leading," "trailing," etc., is used with reference to the orientation of the Figure(s) being described. Because components of embodiments can be positioned in a number of orientations, the directional terminology is used for purposes of illustration and is in no way limiting. It is to be understood that other embodiments may be utilized and structural or logical changes may be made without departing from the scope of the invention. The detailed description describes examples for practicing the invention and is not to be read to limit the scope of the invention. The scope of the invention is defined by the attached claims.

End means endmost. Relative to an observer, for example a surgeon, a distal end is the furthest endmost location of a distal portion of a thing being described, whereas a proximal end is the nearest endmost location of a proximal portion of the thing being described. The portion next to or adjacent to an end is an end portion.

An implanted penile prosthesis has proven useful in treating erectile dysfunction in men. One acceptable implantable penile prosthetic includes two inflatable cylinders implanted in the penis, a pump implanted in the scrotum or other internal space of the body, and a liquid holding reservoir implanted in the abdomen or other internal space of the body.

In a typical implantation procedure, the penis of the patient is incised in a corporotomy to expose a pair of corpora cavernosa that are aligned axially in a side-by-side orientation within the penis. A cutting implement, such as a curved Mayo scissors, is employed to penetrate the fascia of the penis and form an opening accessing each corpus cavernosum. Subsequently, each corpus cavernosum is dilated (opened) with an appropriate dilation tool to form a recess that is sized to receive one of the two cylinders of the penile prosthetic. Thereafter, a tool (referred to by surgical practitioners as a "Furlow" introducer) is inserted into each dilated corpora cavernosum to measure a length of the penis distally and proximally to determine a desired length of the cylinders to be implanted. A cylinder of the appropriately selected length is secured to a suture, and the suture is secured to a needle (sometimes called a "Keith" needle). The needle delivers the cylinder into the cavernosum. The surgeon places the pump inside of the scrotum and the reservoir inside of the abdomen.

With the components of the prosthesis implanted, the surgeon cuts the tubing to a selected length and connects the tubing of the reservoir to the tubing of the pump by sliding a sleeve of a connector assembly between the spliced tubing and over the ends of the spliced tubing. A first sleeve of the connector is pushed over a respective first connector cage and a second sleeve of the connector is pushed over its respective second connector cage to durably connect the connector to the two tubing sections. The tool described in this application allows a surgeon to easily manipulate and slide the connector sleeves into positive engagement with the respective cages even when the sleeves are slippery and difficult to grasp.

FIG. 1 is an isometric view of one embodiment of a tool 20. The tool 20 includes a vertex end 30 opposite from an open end 32, a first arm 40 extending from the vertex end 30 to a first distal end 42, and a second arm 50 extending from the vertex end 30 to a second distal end 52. The first distal end 42 is spaced apart from the second distal end 52 by a distance D to define the open end 32 of the tool 20. The distance D is sized to be larger than a length of an open tubing connector so that the distal ends 42, 52 of the arms 40, 50 slide over tubing sections attached to either side of the tubing connector.

A first touch pad 60 is connected to the first arm 40, where the first touch pad 60 has a first width W that is wider than a width (w) of the first arm. A second touch pad 70 connected to the second arm 50, where the second touch pad 70 likewise has a second width that is wider than a width of the second arm 50. The touch pads provide a secure surface that allows the surgeon to manipulate the tool 20 even if the environment is wet and slippery.

The first arm 40 has a first recess 80 located between an exterior surface 82 of the first arm and an interior surface 84 of the first arm 40, and a first collar 86 integrated with the exterior surface 82 of the first arm 40, where the first collar 86 forms an open diameter that is less than a diameter of the first recess 80 opening. A first slot 88 is formed in the first distal end 42 through a portion of the first collar 86 to communicate with the first recess opening 80. The first slot 88 is sized to slide over the tubing of an implant, where the tubing has a smaller diameter than a diameter of the tubing connector (See FIG. 9). The first recess 80 does not extend through an entire thickness of the arm 40, but instead extends from the interior surface 84 of the first arm 40 to the first collar 86. The first collar 86 has a through opening communicating through the exterior surface 82 of the first arm 40. In this manner, the collar 86 has a smaller open area than the recess 80, which allows the collar 86 to engage and press against a tubing connector that is captured within the recess 80.

The second arm 50 has a similar recess and collar as the first arm 40. For example, the second arm 50 includes a second recess opening 90 located between an exterior surface 92 of the second arm and an interior surface 94 of the second arm, a second collar 96 integrated with the exterior surface 92 of the second arm, where the second collar 96 forms an open diameter that is less than a diameter of the second recess opening. A second slot 98 is formed in the second distal end 52 through a portion of the second collar 96 to communicate with the second recess opening 90.

Figure 9:
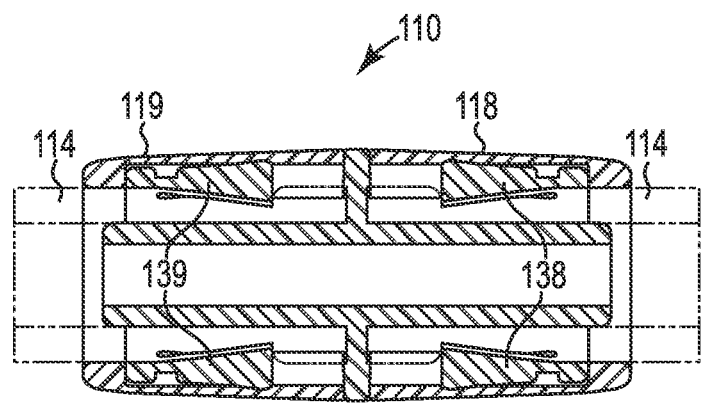
FIG. 9 is a front view of a connector tool positioned to be engaged with a tubing connector.
Figure 9:
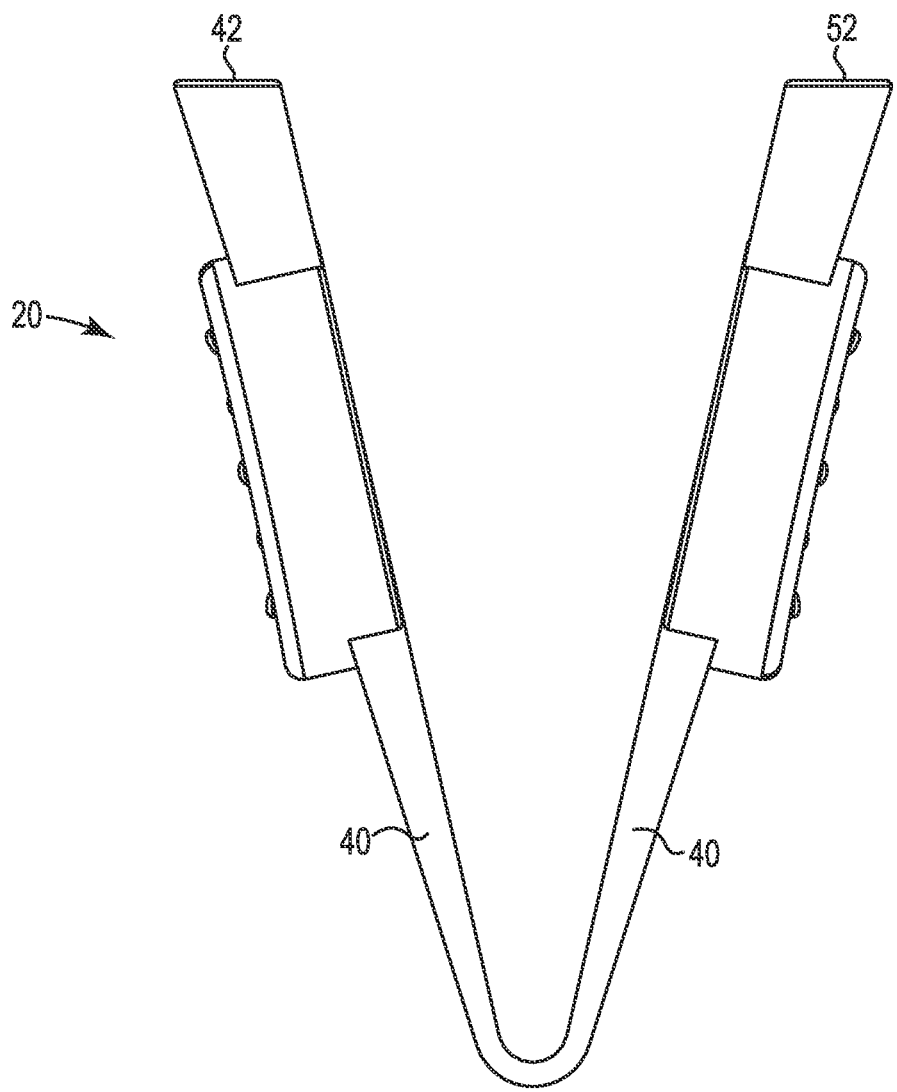

During connection of the spliced tubing, the first slot 88 formed in the first distal end 42 is sized to slide over and receive the first tubing section and the second slot 98 formed in the second distal end 52 is sized to slide over the second tubing section that is separate from and spliced apart from the first tubing section, which positions the collars 86, 96 to press against the sleeves of the connector to ultimately secure the connector across the splice in the tubing (See FIG. 9).

The first collar 86 allows a pinching movement of the first arm to apply an inwards lateral force to the sleeve of the first connector, and the second collar 96 allows the pinching motion to likewise apply an inward force the sleeve of the second connector to move the sleeves over a respective one of their connector cages, where the connector cages pinch the tubing to durably secure the two sections of tubing together.

Figure 2:
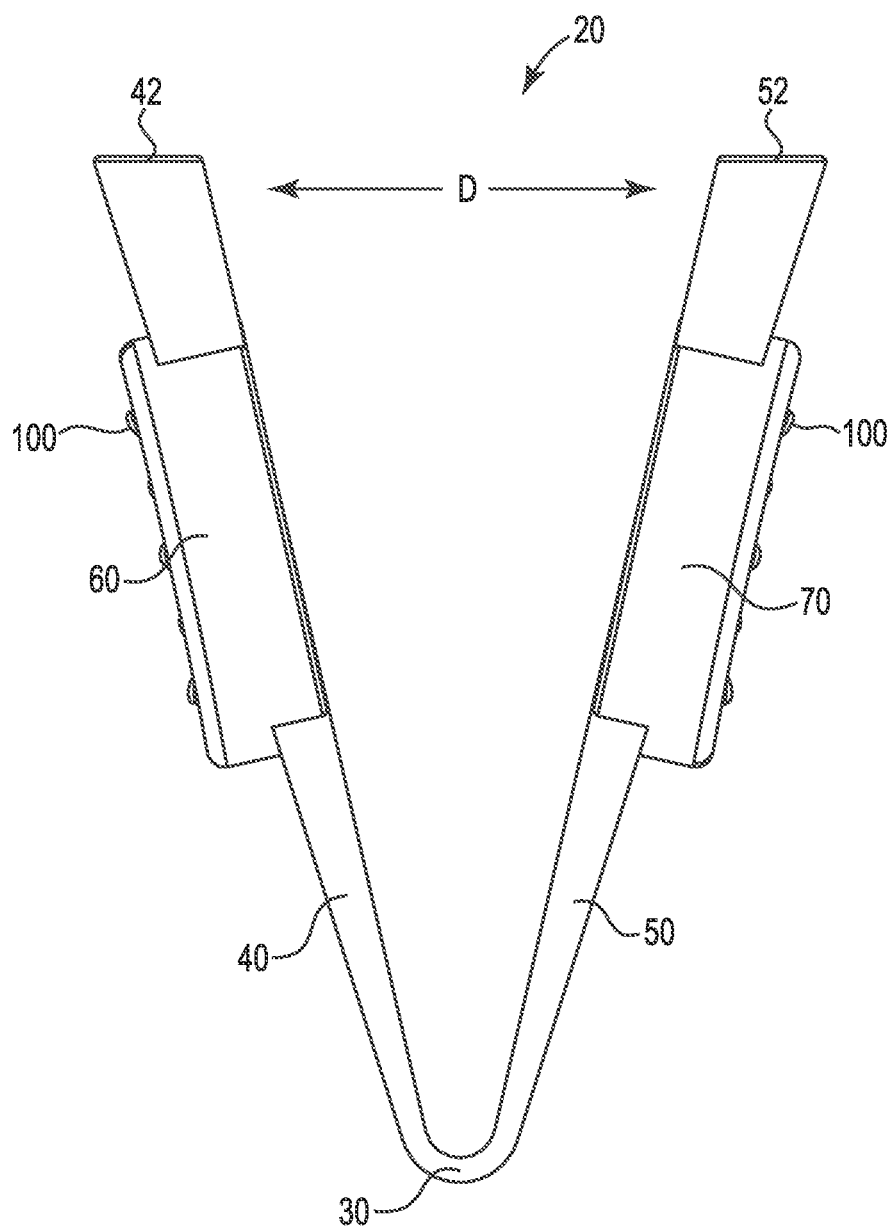
FIG. 2 is a front view of the tool, where a back side view is a mirror image.

FIG. 2 is a front view of the tool 20. The tool 20 is different from a tweezers or pliers in that the first distal end 42 does not touch the second distal end 52 when the tool 20 is employed to secure the connectors to tubing. The distal ends 42, 52 are separated by an initial distance D when the tool 20 is at rest. The distal ends 42, 52 move closer together when the tool 20 is used to couple the connector sleeves over a spliced section of tubing. Due to the presence of the connectors, the ends 42, 52 do not touch during use.

The touch pads 60, 70 provide an area that is larger than a local area of the respective arms 40, 50. This allows the surgeon to apply a relatively large force (or "gain purchase") to bring the arms together. In one embodiment, the pads 60, 70 are textured with a surface pattern 100, for example a bar pattern or a dot pattern or indents/dimples or a textured pattern, to provide a high surface friction so the surgeon's fingers do not slip during the compression part of the coupling motion. The touch pads 60, 70 provide a concave surface to receive the fingers (or a finger and a thumb) of the hand to ensure positive engagement of the tool 20 in the surgeon's hand.

In one embodiment, the tool 20 is formed of a polymer such as polypropylene or high-density polyethylene and the vertex 30 has a hinge property. The tool 20 may be acceptably formed of metal like stainless steel or some other polymer. The hinge property allows the vertex 30 to flex as the arms 40, 50 move inward, and then subsequently allows the arms to move outward. The tool 20 can repeat this motion, and thus in one embodiment the vertex is referred to as a flexible hinge.

In one embodiment, the flexible hinge is formed from a polymer and is thinner than either arm 40, 50 and is referred to as a living hinge. The vertex 30 is formed to be thinner than the arms 40, 50, but is made of the same polymer and acts as a bridge between the arms 40, 50. This allows the living hinge vertex 30 to flex and rotate, which allows the hinge to maintain its properties through hundreds or thousands of cycles of opening and closing.

Figure 3:
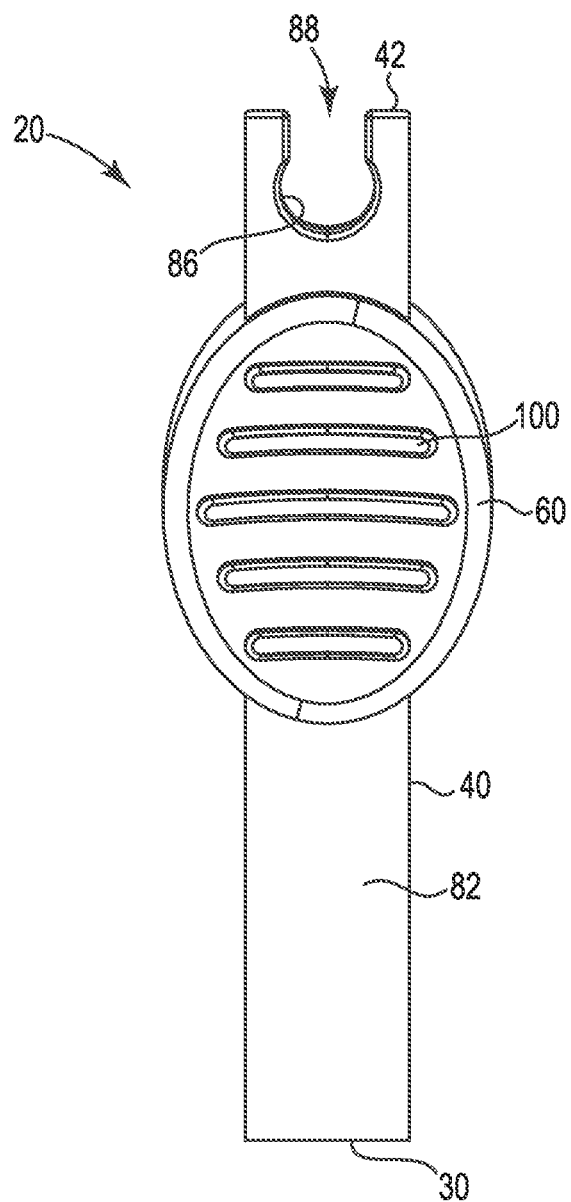
FIG. 3 is a left side view of the tool.

FIG. 3 is a left side view of the tool 20 showing the exterior surface 82 of the arm 40 extending from the vertex 30 to the distal end 42. The pad 70 includes the gripping pattern 100. The distal end 42 includes the slot 88 and the collar 86.

Figure 4:
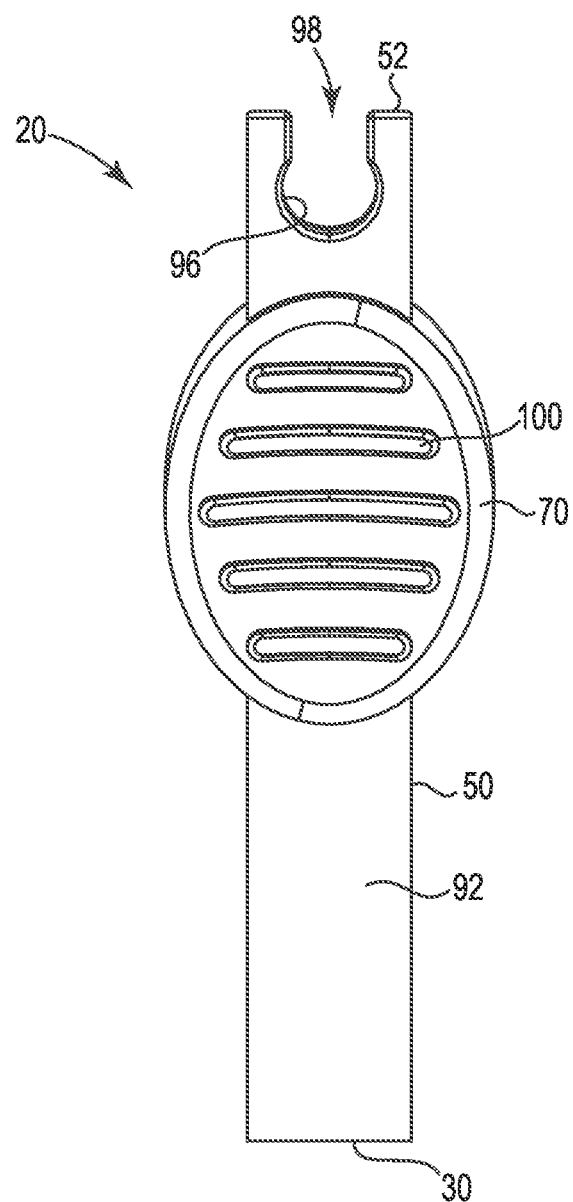
FIG. 4 is a right side view of the tool.

FIG. 4 is a right side view of the tool 20 showing the exterior surface 92 of the arm 50 extending from the vertex 30 to the distal end 52. The pad 70 includes the gripping pattern 100. The distal end 52 includes the slot 98 and the collar 96.

Figure 5:
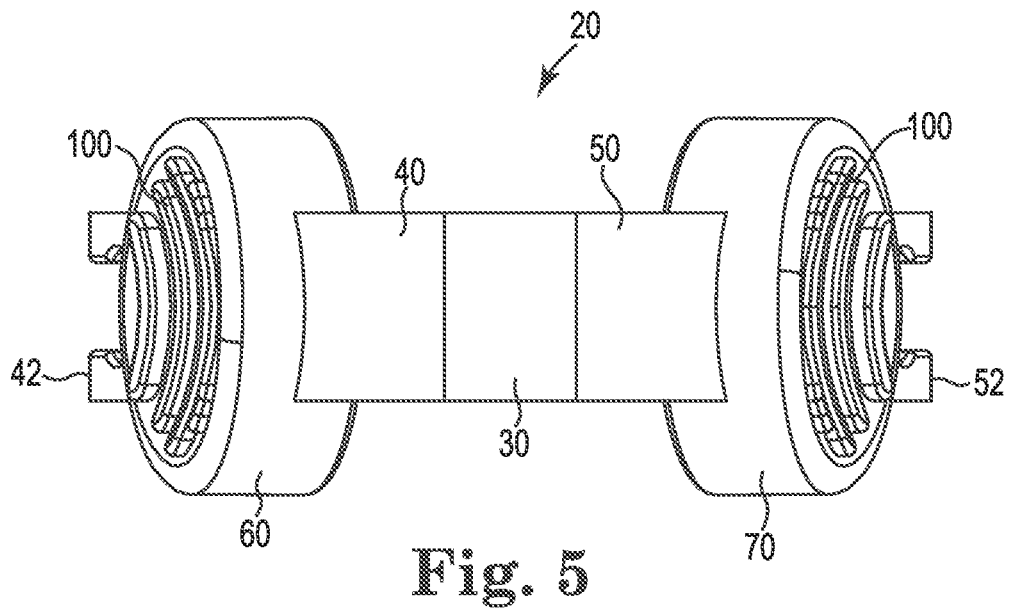
FIG. 5 is bottom side view of the tool.

FIG. 5 is bottom side view of the tool 20 showing the vertex 30, the arms 40, 50 each extending to a respective distal end 42, 52. The opposing touch pads 60, 70 each include a high friction pattern 100.

Figure 6:
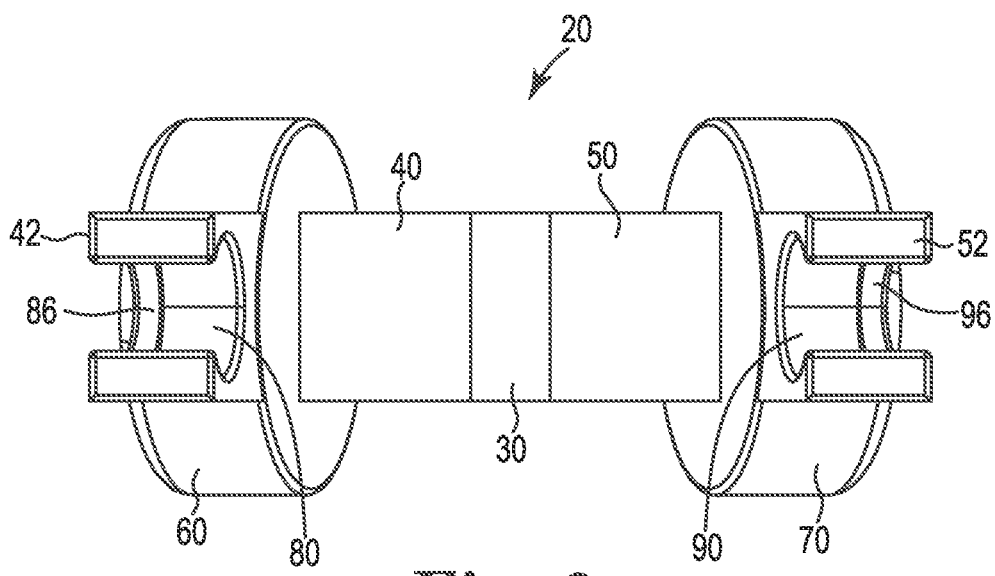
FIG. 6 is a top side view of the tool.

FIG. 6 is a top side view of the tool 20 showing a view inside the arms 40, 50 and into the recesses 80, 90 and their respective collars 86, 96.

Figure 7:
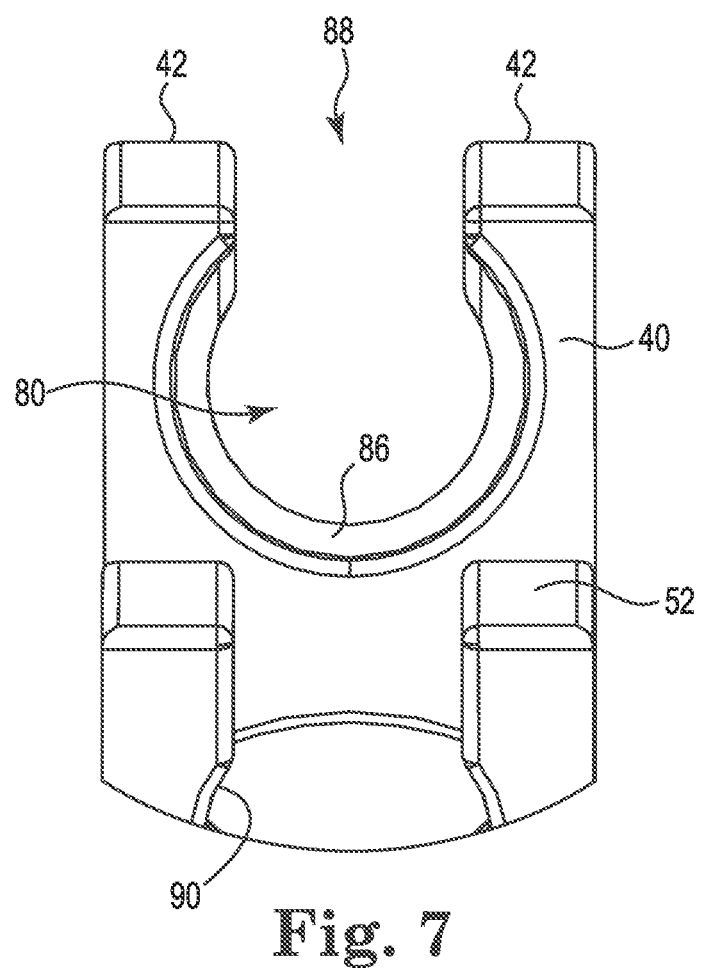
FIG. 7 is a view of a distal end of two arms of the tool.

FIG. 7 is a view of the distal end 42 of the tool 20. The slot 88 is sized to pass over a spliced section of tubing that includes a first tubing section coupled to a pump and a separate second section of tubing coupled to an implantable penile prosthesis. The recess opening 80 is sized to receive a sleeve of a connector assembly, and the collar 86 is sized to be smaller than the sleeve of the connector assembly so the collar 86 can be positioned to push forcefully against the sleeve. In one embodiment, the recess opening 80 is semi-circular in cross-section and cylindrical in volume between the exterior and interior surfaces of the arm 40.

Figure 8:
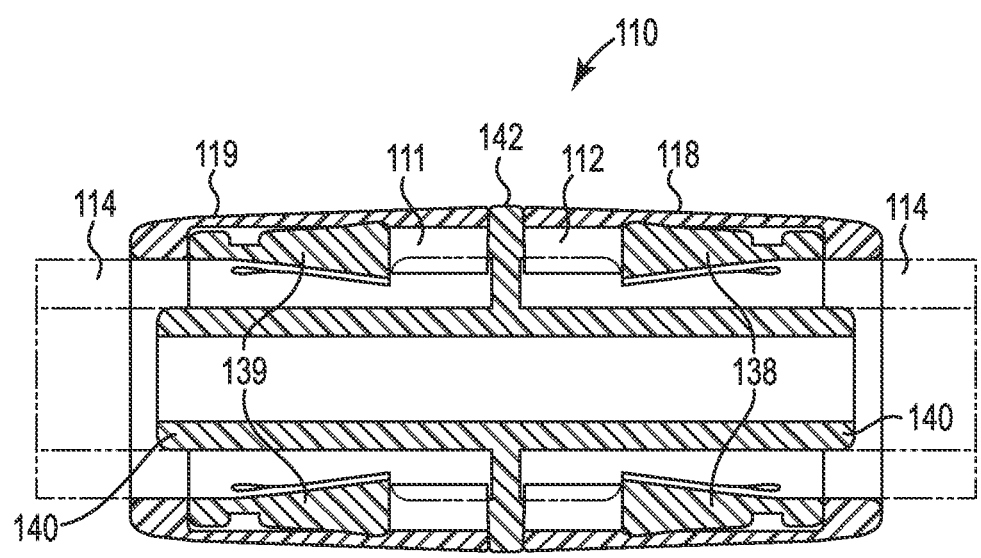
FIG. 8 is a cross-sectional view of one connector having a sleeve that is adapted to slide over a connector cage.

FIG. 8 is cross-sectional view of a connector assembly 110 adapted to secure two ends of a sliced piece of tubing 114 together. The connector assembly 110 has a sleeve 118 that is adapted to slide over a right side connector cage 112 to force a right side chuck member 138 into the right side portion of the spliced tubing 114, and a sleeve 119 that is adapted to slide over a left side connector cage 111 to force a left side chuck member 139 into the left side portion of the spliced tubing 114. The tubing 114 fits around a cannula 140 of the connector assembly 110, and the tubing sections are pushed into engagement with a central tubing stop 142.

The view of FIG. 8 shows the chuck members 138, 139 closed and pinching against the two sections of spliced tubing. In the closed configuration, the sleeve 118 and the sleeve 119 are pushed toward each other to a closed position against the tubing stop 142 such that the right side chuck member 138 is deflected by the sleeve 118 to engage the right side portion of the spliced tubing 114 and the left side chuck member 139 is deflected by the sleeve 119 to engage the left side portion of the spliced tubing 114.

FIG. 9 is a depiction of the tool 20 engaging with the connector assembly 110, with additional reference made to the features of FIG. 1 and FIG. 8. The slot 88 of the tool 20 is sized to slide over the right side portion of the spliced tubing 114 so the sleeve 119 is captured in the recess opening 80. The collar 86 is positioned to push on the left side of sleeve 119. The slot 90, in a similar manner, is sized to slide over the right side portion of the spliced tubing 114 so the sleeve 118 is captured in the recess opening 90. The collar 96 is thus positioned to push against the sleeve 118 when the arms 40, 50 of the tool 20 are pinched inwardly. The tool 20 allows even slippery sleeves 118, 119 to be brought together forcefully enough to compress the chuck members 138, 139 into the tubing to complete the connection between two tubing sections (114 left and 114 right).

A kit of parts is formed when the connector assembly 110 (FIG. 8), or several such assemblies, are packaged together with the tool 20 (FIG. 1), a reservoir and tubing, a pump and tubing, and a penile cylinder and its tubing. The connector assembly 110 of FIG. 8 is suitable to connect the tubing between the reservoir and the pump and between the pump and the penile cylinder(s). One tool 20 in the kit of parts is suitable for securing all the connector assemblies to respective portions of tubing sections.

A method of connecting a first tubing section to a second tubing section is disclosed. The method includes:
  providing a penile prosthesis having a pump and pump tubing coupled to the pump and a reservoir and reservoir tubing coupled to the reservoir;
  providing a connector as in FIG. 8 having a first end 36 and a second end 37, and inserting the first end into the pump tubing and inserting the second end into the reservoir tubing;
  providing a tool 20 (FIG. 1) having a first arm 40 and a second arm 50, with each of the first arm 40 and the second arm 50 having a recess opening 80, 90, a collar 86, 96 integrated with an exterior surface 82, 92 of the each of the first arm 40 and the second arm 50, where the collar 86, 96 forms an open diameter that is less than a diameter of the recess opening 80, 90, and a slot 88, 98 formed in a distal end 42, 52 of the each of the first arm 40 and the second arm 50 through a portion of the collar 86, 96 and communicating with the recess opening 80, 90;

sliding the pump tubing through the slot 88 of the first arm 40 and the open diameter of the collar 86 of the first arm 40, and engaging the collar 86 of the first arm 40 with a first sleeve 19 of the connector;

sliding the reservoir tubing through the slot 98 of the second arm 50 and the open diameter of the collar 96 of the second arm 50, and engaging the collar 96 of the second arm 50 with a second sleeve 18 of the connector;

pinching the first arm 40 toward the second arm 50, sliding the first sleeve 19 in a direction toward the reservoir tubing, and securing the first end 36 of the connector in the pump tubing, and sliding the second sleeve 18 in a direction toward the pump tubing, and securing the second end 37 of the connector in the reservoir tubing. The sleeves 19 and 18 are moved toward a center of the connector, which presses the chuck members of the connector into the respective pump or reservoir tubing. The tool provides a firm and positive grip surface for the surgeon, which is useful if the tubing or the connector are slippery.

Figure 10:
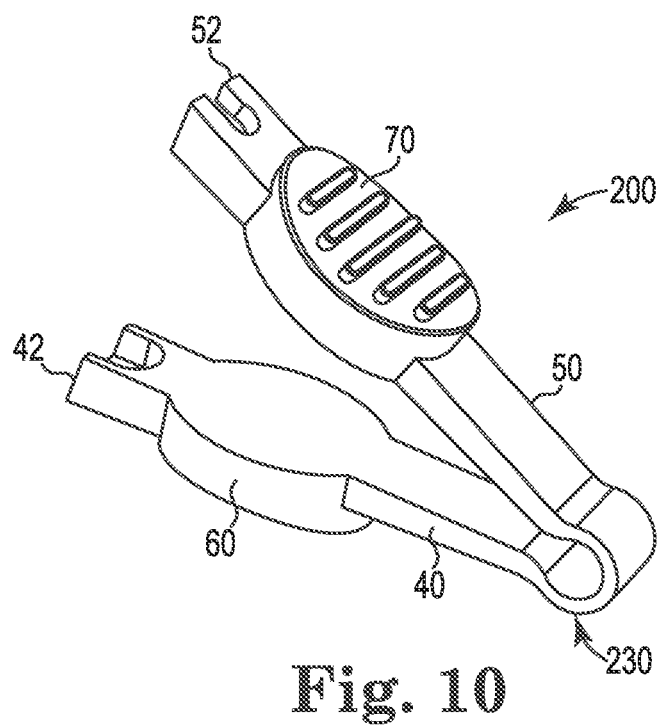
FIG. 10 is an isometric view of another embodiment of a tool.
Figure 11:
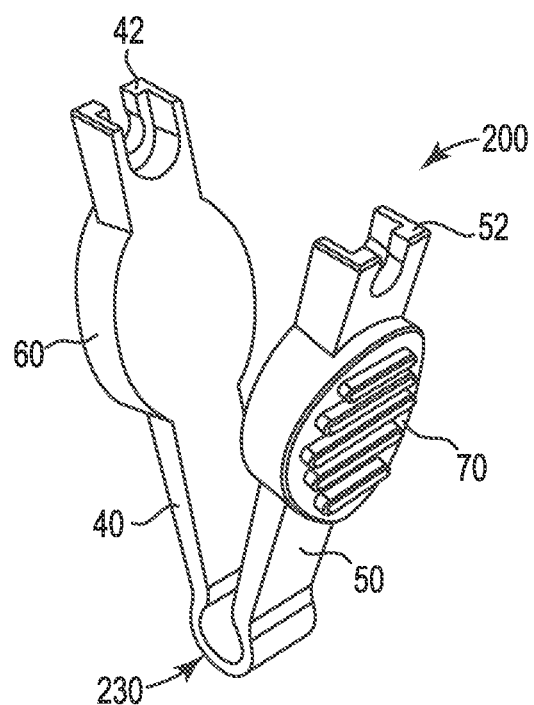
FIG. 11 is an isometric view of the tool shown in FIG. 10.

FIG. 10 is an isometric view of another embodiment of a tool 200 and FIG. 11 is an isometric view of the tool 200. The tool 200 includes the arms 40, 50 of the tool 20 (FIG. 1), and the pads 60, 70 of the tool 20, along with the features of the distal ends 42, 52 of the tool 20, but also includes a semi-circular-shaped end 230, or vertex 230, to aid in stress relief and force amplification. The semi-circular-shaped vertex 230 allows a surgeon to push against the sleeves 118, 119 (FIG. 8) of the connector assembly 110 more forcefully, while also improving the elastic recovery of the arms 40, 50 to the initial open position.

Figure 12:
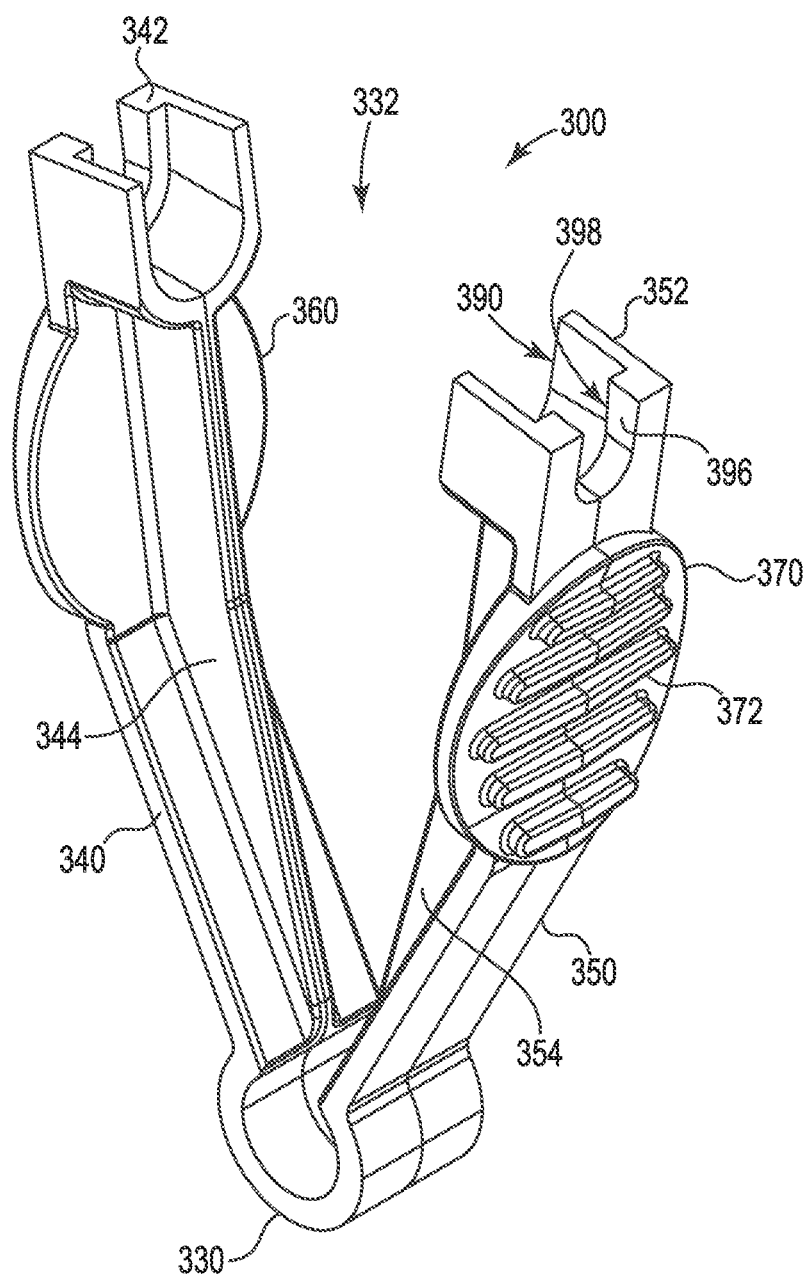
FIG. 12 is an isometric view of another embodiment of a tool.
Figure 13:
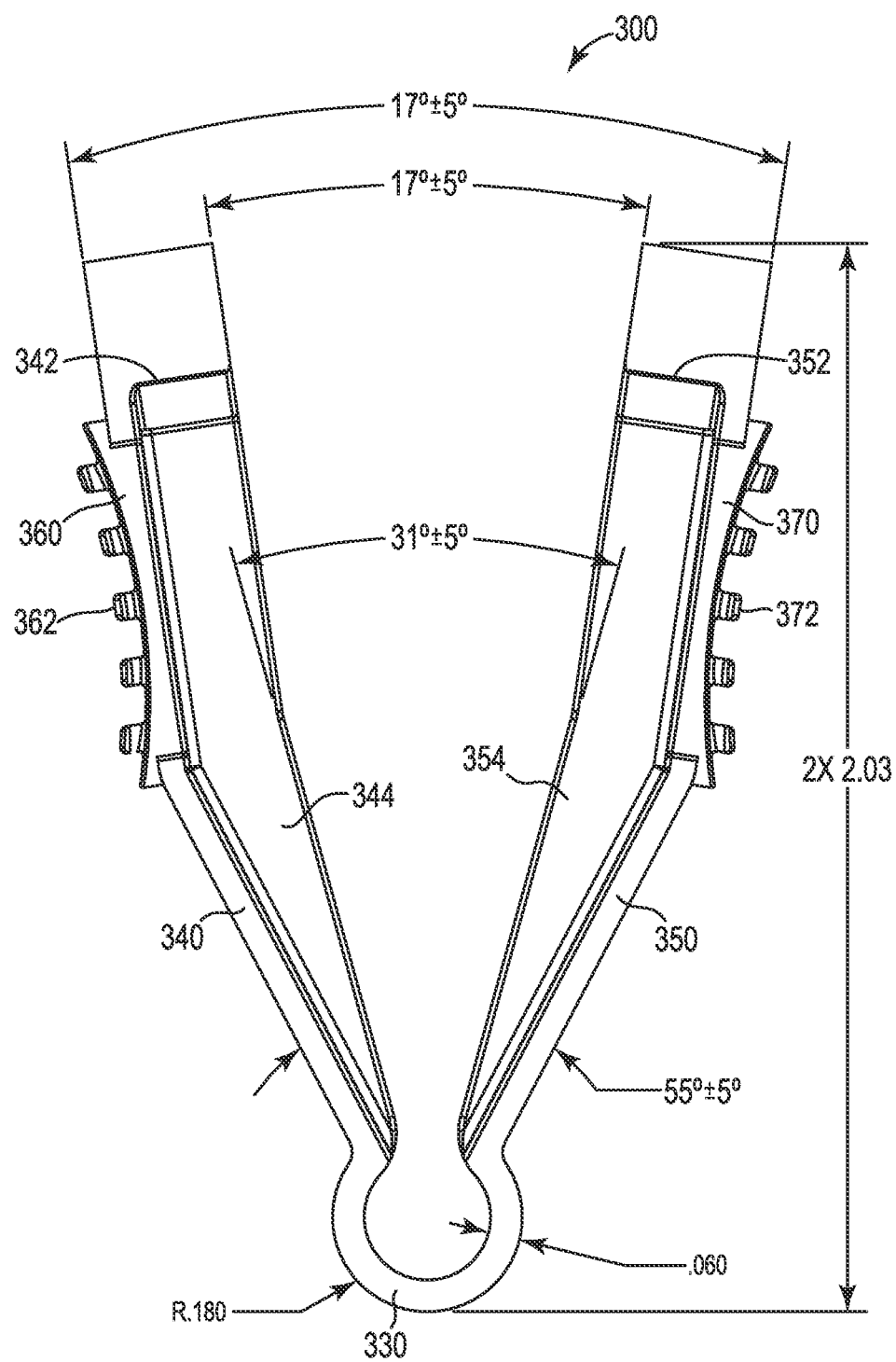
FIG. 13 is a front view of the tool shown in FIG. 12.
Figure 14:
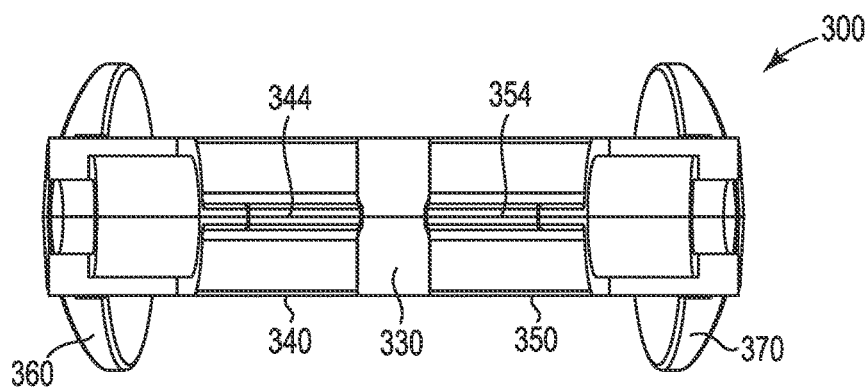
FIG. 14 is a top side view of the tool shown in FIG. 12.
Figure 15:
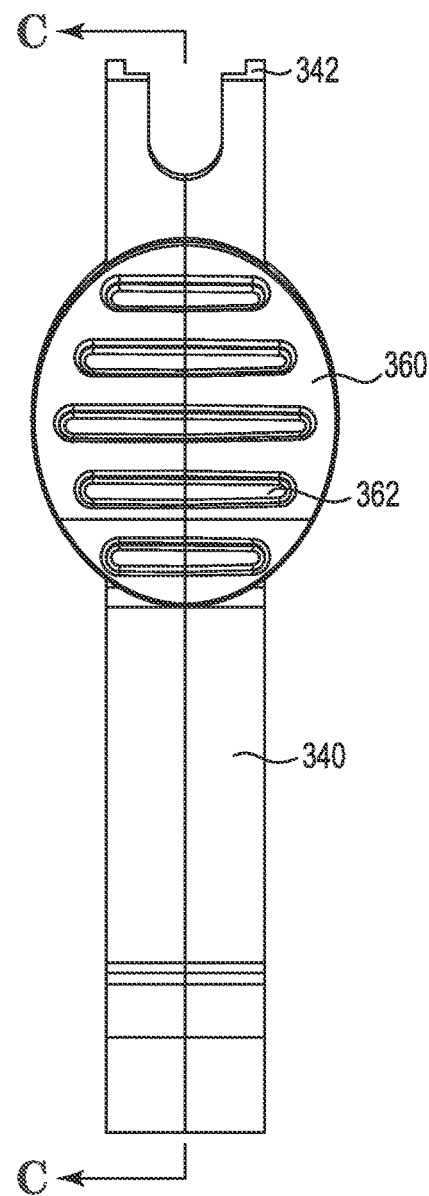
FIG. 15 is a left side view of the tool shown in FIG. 12.
Figure 16:
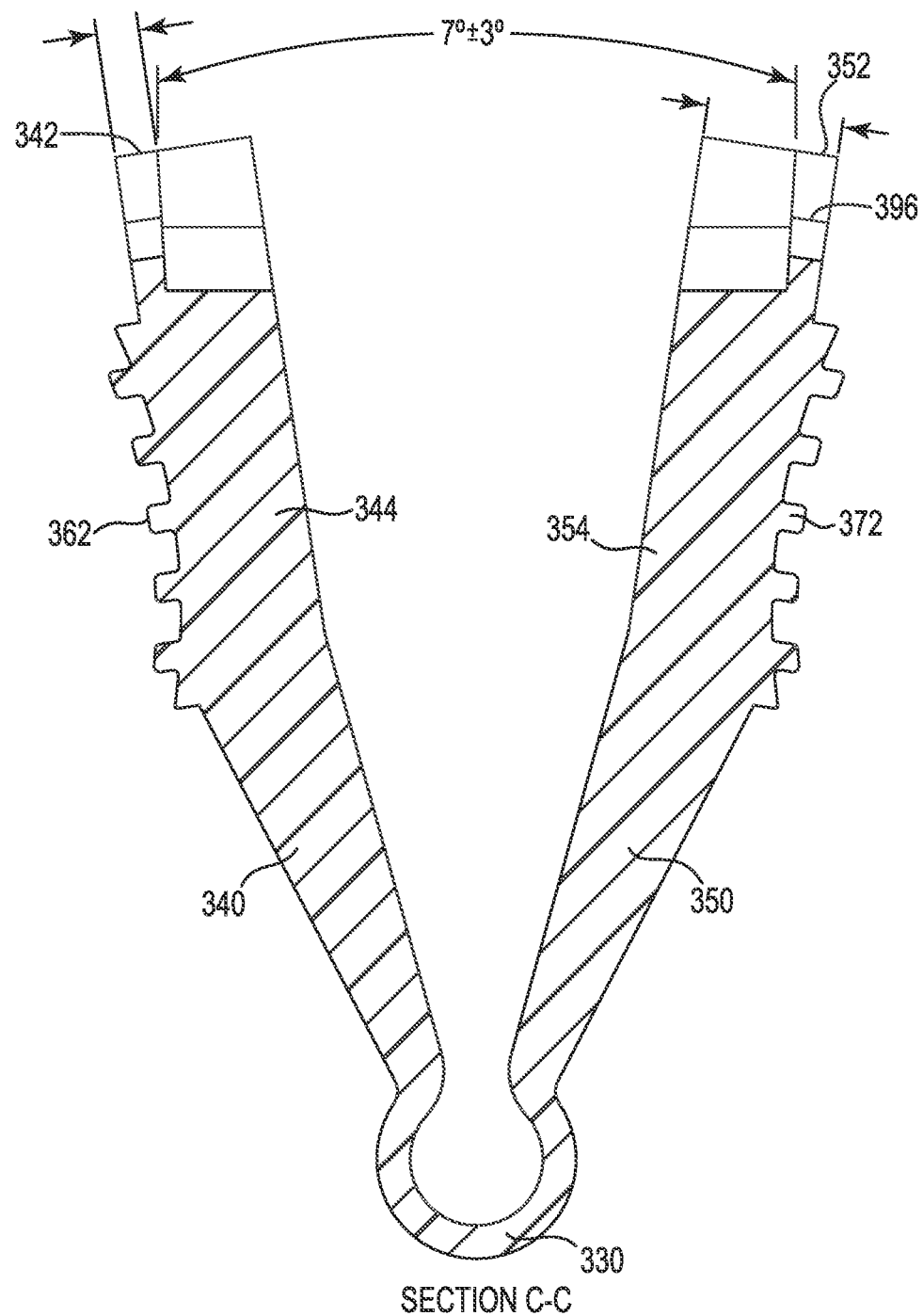
FIG. 16 is a cross-sectional view of the tool taken through line C-C as shown in FIG. 15.

FIG. 12 is an isometric view of another embodiment of a tool 300, FIG. 13 is a front view of the tool 300, FIG. 14 is a top side view of the tool 300, FIG. 15 is a left side view of the tool 300, and FIG. 16 is a cross-sectional view of the tool 300 taken through line C-C as shown in FIG. 15.

FIG. 13 and FIG. 16 provide examples of dimensions and angles acceptable for embodiments of the tool 300. Other dimensions and other angles between the arms 340, 350 are also acceptable.

The tool 300 includes a vertex end 330, a first arm 340 extending from the vertex end 330 to a first distal end 342, and a second arm 350 extending from the vertex end 330 to a second distal end 352, where each arm includes a respective spline 344, 354.

The first distal end 342 is spaced apart from the second distal end 352 by a distance to define the open end 332 of the tool 300. A first touch pad 360 is connected to the first arm 340, where the first touch pad 360 is wider than a width of the first arm 340. A second touch pad 370 connected to the second arm 350, where the second touch pad 370 likewise is wider than a width of the second arm 350. Each touch pad 360, 370 is provided with a series of ribs 362, 372 that are raised off from the surface of the pad 360, 370 to provide a high friction surface and a tactile indicator on the pad to inform the user or surgeon that their thumb is engaged with the pad. Other friction providing surfaces for the pads 360, 370 are envisioned as acceptable.

The first arm 340 and the second arm 350 are similar to the embodiments of FIG. 1 and FIG. 10, where each has a recess opening 390 formed between an exterior surface of the arm 340, 350 and an interior surface of the arm 340, 350, with a collar 396 integrated with the exterior surface of the arm 350. The collar 396 forms an open diameter that is less than a diameter of the recess opening 390, and a slot 398 is formed in the distal end 352 through a portion of the recess 390 and the collar 396. The slot 398 communicates with the recess opening 390 to allow a segment of spliced tubing to slide in through the slot for positioning the collar 396 with the connector sleeve (FIG. 8). The tubing moves through the distal end 352 of the arm 350 which positions the connector assembly 110 (FIG. 8) between the arms 340, 350 to allow the collar 396 to push the sleeves of the connector inward.

Each spline 344, 354 begins where the vertex 330 ends at the arm 340, 350 and the splines 344, 354 each extend over each arm 340, 340 and over each pad 360, 370 up to and terminating at the collar 396. The splines 344, 354 strengthen the rigidity of the arms 340, 350 and prevent or limit twisting of the arms 340, 350 about their longitudinal axis during closure of the connector assembly 110 (FIG. 8).

Although specific embodiments have been illustrated and described, it will be appreciated by those of ordinary skill in the art that a variety of alternate and equivalent implementations may be substituted for the specific embodiments shown and described without departing from the scope of the present invention. This application is intended to cover any adaptations or variations of the kind of medical devices described above. Therefore, it is intended that this invention be limited only by the claims and their equivalents.

What is claimed is:

1. A tool adapted to secure a connector to spliced tubing of an implantable penile prosthesis including a first tubing section and a separate second tubing section, the tool comprising:

a vertex end and an open end;

a first arm extending from the vertex end to a first distal end, and a second arm extending from the vertex end to a second distal end, where the first distal end is spaced apart from the second distal end to define the open end of the tool;

a first touch pad connected to the first arm, where the first touch pad has a first width that is wider than a width of the first arm; and a second touch pad connected to the second arm, where the second touch pad has a second width that is wider than a width of the second arm;

wherein the first arm comprises:
  a first recess opening formed between an exterior surface of the first arm and an interior surface of the first arm,
  a first collar integrated with the exterior surface of the first arm, where the first collar forms an open diameter that is less than a diameter of the first recess opening,
  a first slot formed in the first distal end through a portion of the first collar and in communication with the first recess opening, and
  a first spline, where the first spline has a first end beginning where the vertex ends at the first arm, with the first spline extending over the first arm and the first touch pad and terminating at a second end at the first collar;

wherein the second arm comprises:
  a second recess opening formed between an exterior surface of the second arm and an interior surface of the second arm,
  a second collar integrated with the exterior surface of the second arm, where the second collar forms an open diameter that is less than a diameter of the second recess opening, and
  a second slot formed in the second distal end through a portion of the second collar and in communication with the second recess opening;

wherein the first slot formed in the first distal end is sized to receive the first tubing section and the second slot formed in the second distal end is sized to receive the second tubing section;

wherein the first collar of the first arm is adapted to capture the connector in the first recess opening, and the second collar of the second arm is adapted to capture the connector in the second recess opening.

2. The tool of claim 1, wherein the vertex comprises a semi-circular-shaped vertex.

3. The tool of claim 1, wherein the vertex forms an acute angle measured between the interior surface of the first arm and the interior surface of the second arm.

4. The tool of claim 1, wherein the first touch pad comprises a non-circular outside diameter.

5. The tool of claim 1, wherein the first touch pad comprises an ellipse.

6. The tool of claim 1, wherein the first touch pad comprises a textured exterior surface.

7. The tool of claim 1, wherein the first touch pad projects a distance above the exterior surface of the first arm.

8. The tool of claim 1, wherein the interior surface of the first arm is planar.

9. The tool of claim 1, further comprising a second spline, where the second spline has a first end beginning where the vertex ends at the second arm, with the second spline extending over the second arm and the second touch pad and terminating at a second end at the second collar.

10. A method of connecting tubing during implantation of an implant to treat erectile dysfunction, the method comprising:

providing a penile prosthesis having a pump and pump tubing coupled to the pump and a reservoir and reservoir tubing coupled to the reservoir;

providing a connector having a first end and a second end, and inserting the first end into the pump tubing and inserting the second end into the reservoir tubing;

providing a tool having a closed vertex end and a first arm and a second arm extending away from the closed vertex end, with each of the first arm and the second arm having a recess opening, a collar integrated with an exterior surface of the each of the first arm and the second arm, where the collar forms an open diameter that is less than a diameter of the recess opening, a slot formed in a distal end of each of the first arm and the second arm through a portion of the collar and communicating with the recess opening, and a spline to limit twisting of each of the first arm and the second arm, where each spline extends along a respective one of the first arm and the second arm from the vertex end to the respective collar;

sliding the pump tubing through the slot of the first arm and engaging the collar of the first arm with a first sleeve of the connector;

sliding the reservoir tubing through the slot of the second arm and engaging the collar of the second arm with a second sleeve of the connector; and moving the first arm toward the second arm and moving the second arm toward the first arm and pushing the first sleeve toward a center of the connector and pushing the second sleeve toward the center of the connector and securing the first end of the connector to the pump tubing and securing the second end of the connector to the reservoir tubing.

\* \* \* \* \*